(12) United States Patent
Kohno et al.

(10) Patent No.: US 7,110,468 B2
(45) Date of Patent: Sep. 19, 2006

(54) TRANSMISSION APPARATUS, TRANSMISSION METHOD, COMMUNICATION SYSTEM, AND METHOD OF SAME

(75) Inventors: Ryuji Kohno, Tokyo (JP); Kazunori Watanabe, Kanagawa (JP); Kouji Ishii, Kanagawa (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 09/979,453

(22) PCT Filed: Mar. 16, 2001

(86) PCT No.: PCT/JP01/02090

§ 371 (c)(1),
(2), (4) Date: Apr. 9, 2002

(87) PCT Pub. No.: WO01/69815

PCT Pub. Date: Sep. 20, 2001

(65) Prior Publication Data

US 2003/0142756 A1    Jul. 31, 2003

(30) Foreign Application Priority Data

Mar. 16, 2000  (JP) .............................. 2000-079377

(51) Int. Cl.
*H04L 27/04*    (2006.01)
(52) U.S. Cl. ...................................... 375/295; 375/299
(58) Field of Classification Search ................ 375/140, 375/141, 299, 349, 296, 267, 341, 347, 295, 375/265; 370/334, 335–337, 319–321; 455/272, 455/522, 562
See application file for complete search history.

(56) References Cited

U.S. PATENT DOCUMENTS 5,425,059 A    6/1995  Tsujimoto (Continued)

FOREIGN PATENT DOCUMENTS

JP    63-286027    11/1988

(Continued)

OTHER PUBLICATIONS

R. Kohno: "Spatial and Temporal Communication Theory Using Adaptive Antenna Array" IEEE Personal Communications, pp. 28-35, Feb. 1998.

(Continued)

*Primary Examiner*—Emmanuel Bayard
(74) *Attorney, Agent, or Firm*—Finnegan, Henderson, Farabow, Garrett & Dunner, L.L.P.

(57) ABSTRACT

To provide a transmission apparatus and a communication system that transmit a plurality of transmission signals riding on different interfering transmission beams, separate and receive the transmission signal at the receiving side, and estimate the original transmission signal by maximum likelihood estimation based on the correlation among the received signals. A transmission apparatus which encodes the transmission signal by an encoding means to generate at least two transmission signals S1 and S2, modulates the signals to the carrier frequencies, weights them and supplies them to the antenna elements, and controls the weights to transmit the modulated output signals by beams partially overlapping each other in space. A reception apparatus which separates and receives the transmission signals by a channel adaptive antenna to receive at least two received signals RS1 and RS2 and estimates the original transmission signal using maximum likelihood estimation, for example, a Viterbi decoding algorithm, based on the correlation between the received signals so as to reduce the error rate of the received signal and realize an improvement of the quality of communication.

24 Claims, 8 Drawing Sheets

U.S. PATENT DOCUMENTS

| | | | |
|---|---|---|---|
| 5,642,353 A * | 6/1997 | Roy et al. | 370/329 |
| 5,754,626 A * | 5/1998 | Otonari | 370/347 |
| 5,886,987 A | 3/1999 | Yoshida et al. | |
| 6,125,110 A * | 9/2000 | Proctor et al. | 370/331 |
| 6,185,258 B1 * | 2/2001 | Alamouti et al. | 375/260 |
| 6,240,098 B1 * | 5/2001 | Thibault et al. | 370/431 |
| 6,556,617 B1 * | 4/2003 | Tsujimoto | 375/141 |
| 6,594,473 B1 * | 7/2003 | Dabak et al. | 455/101 |
| 6,678,263 B1 * | 1/2004 | Hammons et al. | 370/342 |
| 6,788,661 B1 * | 9/2004 | Ylitalo et al. | 370/334 |
| 6,888,899 B1 * | 5/2005 | Raleigh et al. | 375/299 |
| 6,891,897 B1 * | 5/2005 | Bevan et al. | 375/265 |
| 2004/0146014 A1 * | 7/2004 | Hammons et al. | 370/320 |

FOREIGN PATENT DOCUMENTS

| | | |
|---|---|---|
| JP | 06-053870 | 2/1994 |
| JP | 10-013262 | 1/1998 |
| JP | 10-190537 | 7/1998 |

OTHER PUBLICATIONS

N. Ishii and R. Kohno: "Spatially and Temporally Joint Transmitter-Receiver Using an Adaptive Array Antenna" IEICE Trans. Commun., vol. E79-B, No. 3, pp. 361-367, Mar. 1996.

V. Tarokh, N. Seshadri and A. R. Calderbank: "Space-Time Codes for High Data Rate Wireless Communication: Performance Criterion and Code Construction" IEEE Transactions on Information Theory, vol. 44, No. 2, pp. 744-765, Mar. 1998.

* cited by examiner

TRANSMISSION APPARATUS, TRANSMISSION METHOD, COMMUNICATION SYSTEM, AND METHOD OF SAME

TECHNICAL FIELD

The present invention relates to a transmission apparatus performing space-time analog coding for transmission signals using an antenna, a communication system using the transmission apparatus, and a transmission method and communication method of the same.

BACKGROUND ART

In recent years, in mobile communication, there has been a demand for efficient communication in both space and time from the viewpoint of dealing with different communication capacities between uplinks and downlinks, that is, so-called non-symmetrical channels, the simplification of hardware at the mobile station side, and the improvement of the efficiency of utilization of the frequency. Particularly, in view of the adoption of W-CDMA (wide band code division multiple access) as a wireless access scheme for the next generation mobile communication system IMT2000, transmission diversity using a plurality of antenna elements, adaptive antenna arrays using a plurality of antenna elements, and other systems have been proposed as powerful technologies for increasing the capacities of the W-CDMA system.

However, in the prior art described above, there has been almost no study relating to the correlation of the transmission signals due to the interference among beams in the case of transmission by a plurality of transmission beam at the transmitting side. Further, the correlation of the transmission signals due to the interference among beams has not been utilized actively to improve the communication efficiency and to improve the quality of communication. Thus, in the case of transmitting and receiving signals by forming a plurality of beams, that is, so-called space diversity, the interference among beams has almost always been suppressed as much as possible to suppress interference and the correlation of transmission signals has not been utilized effectively.

DISCLOSURE OF THE INVENTION

The present invention was made in consideration of the above circumstances and has as an object to provide a transmission apparatus and a communication system capable of, when transmitting signals by forming a plurality of transmission beams, giving correlation to the transmission signals according to the overlap among beams and estimating the original transmission signal by maximum likelihood estimation considering the correlation among the plurality of received signals separated and received at the receiving side so as to reduce the error rate of the received signals and realize an improvement of the transmission efficiency and improvement of the quality of communication.

To achieve the above object, according to the present invention, there is provided a transmission apparatus comprising an encoding means for encoding a transmission signal to generate at least a first transmission signal and a second transmission signal, a transmission antenna forming at least a first beam and a second beam, and a transmitting means for transmitting said first transmission signal riding on said first beam and transmitting said second transmission signal riding on said second beam, wherein said first beam and second beam are formed so as to partially overlap each other.

Further, in the present invention, preferably the transmission antenna is an array antenna comprising a plurality of antenna elements, and the transmitting means weights the first transmission signal and the second transmission signal modulated to predetermined carrier frequencies with predetermined weights and supplies them to the antenna elements.

Further, in the present invention, the apparatus further comprises a weight determining means for determining weights of the antenna elements and controlling the beam patterns of the first beam and the second beam, and the weight determining means determines the weights of the antenna elements in accordance with the channel characteristics.

Further, the communication system of the present invention comprises an encoding means for encoding a transmission signal to generate at least a first transmission signal and a second transmission signal, a transmission antenna forming at least a first transmission beam and a second transmission beam, a transmitting means for transmitting said first transmission signal riding on said first transmission beam and transmitting said second transmission signal riding on said second beam, a reception antenna forming a predetermined receiving beam and receiving signals transmitted by said transmission antenna using the receiving beam, and a decoding means for estimating the transmission signal by a maximum likelihood estimation according to the received signals of the reception antenna, wherein said first transmission beam and second transmission beam are formed so as to partially overlap each other.

Further, in the present invention, the transmission antenna is an array antenna comprising a plurality of antenna elements.

Further, in the present invention, the reception antenna is an array antenna comprising a plurality of antenna elements, and the reception antenna forms a first receiving beam and a second receiving beam and separates and receives the signals transmitted by the transmission antenna by the first receiving beam and the second receiving beam.

Further, in the present invention, the decoding means estimates the original transmission signal based on the correlation between the received signal received by the first receiving beam and the received signal received by the second receiving beam for example by a Viterbi decoding algorithm.

Further, the communication method of the present invention comprises a step of encoding a transmission signal to generate at least a first transmission signal and a second transmission signal, a step of modulating the first transmission signal and the second transmission signal to predetermined carrier frequencies, and a step of weighting the first transmission signal by a first weight, supplying the same to antenna elements constituting a transmission antenna, and transmitting the same by forming a first transmission beam and of weighting the second transmission signal by a second weight, supplying the same to antenna elements, and transmitting the same by forming a second transmission beam so as to partially overlap the first transmission beam.

Further, the communication method of the present invention comprises a step of encoding a transmission signal to generate at least a first transmission signal and a second transmission signal, a step of modulating the first transmission signal and the second transmission signal to predetermined carrier frequencies, a step of weighting the first transmission signal by a first weight, supplying the same to antenna elements constituting a transmission antenna, and transmitting the same by forming a first transmission beam and of weighting the second transmission signal by a second weight, supplying the same to antenna elements, and transmitting the same by forming a second transmission beam so as to partially overlap the first transmission beam, a step of shaping a beam for compensation of the transmission distortion of the channel and receiving the signals sent by the transmission antenna by the shaped beam, and a step of estimating the original transmission signal in accordance with the received signals by the reception antenna by maximum likelihood estimation.

BEST MODE FOR CARRYING OUT THE INVENTION

Figure 1:
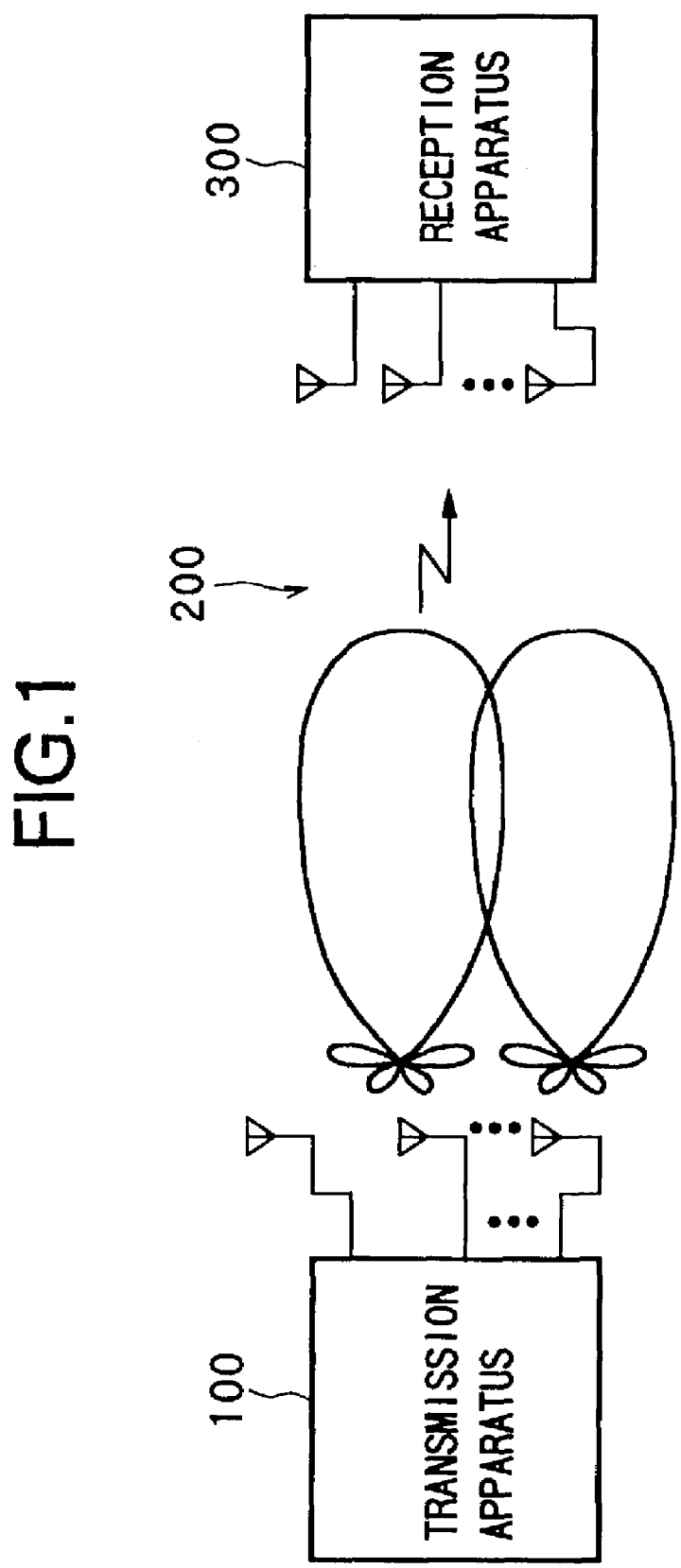
FIG. 1 is a circuit diagram of an embodiment of a communication system according to the present invention.

FIG. 1 is a view of the configuration of an embodiment of a communication system according to the present invention. As illustrated, the communication system of the present embodiment is comprised of a transmission apparatus 100, a channel 200, and a reception apparatus 300.

The transmission apparatus 100 encodes the transmission signal Si, modulates it to a carrier frequency, then transmits it by an antenna array comprised of a plurality of antenna elements. The signal transmitted by the transmission antenna is transmitted to the reception apparatus 300 through the channel 200.

The channel 200 is a transmission path between the transmission apparatus 100 and the reception apparatus 300. Generally, the transmission characteristics of the channel 200 are not constant and change along with time. Particularly, in a mobile communication system, for example, when the transmission apparatus 100 is a base station, the reception apparatus 300 is a mobile communication terminal, and the reception apparatus 300 commutes while moving, the transmission characteristics and the distortion characteristics of the channel 200 change all the time.

The reception apparatus 300 demodulates the signal received by the reception antenna, decodes it by decoding processing, and outputs a decoded signal $S_O$ closest to the original transmission signal. Generally, the decoded signal $S_o$ does not completely replicate the original transmission signal due to the distortion of the channel 200. Error occurs at a certain error rate. The error rate of the decoded signal $S_O$ is reduced by the encoding processing performed in the transmission apparatus 100 and the decoding processing performed in the reception apparatus 300.

As shown in FIG. 1, in the transmission apparatus 100 of the present embodiment, a plurality of transmission beams are formed by an antenna array comprising a plurality of antenna elements (in FIG. 1, two beams B1 and B2 are displayed as an example). The beams B1 and B2 overlap each other in part of the beam patterns in space. That is, the signals transmitted by the beams B1 and B2 interfere with each other in accordance with the beam patterns of the antenna array and are correlated with each other.

Figure 2:
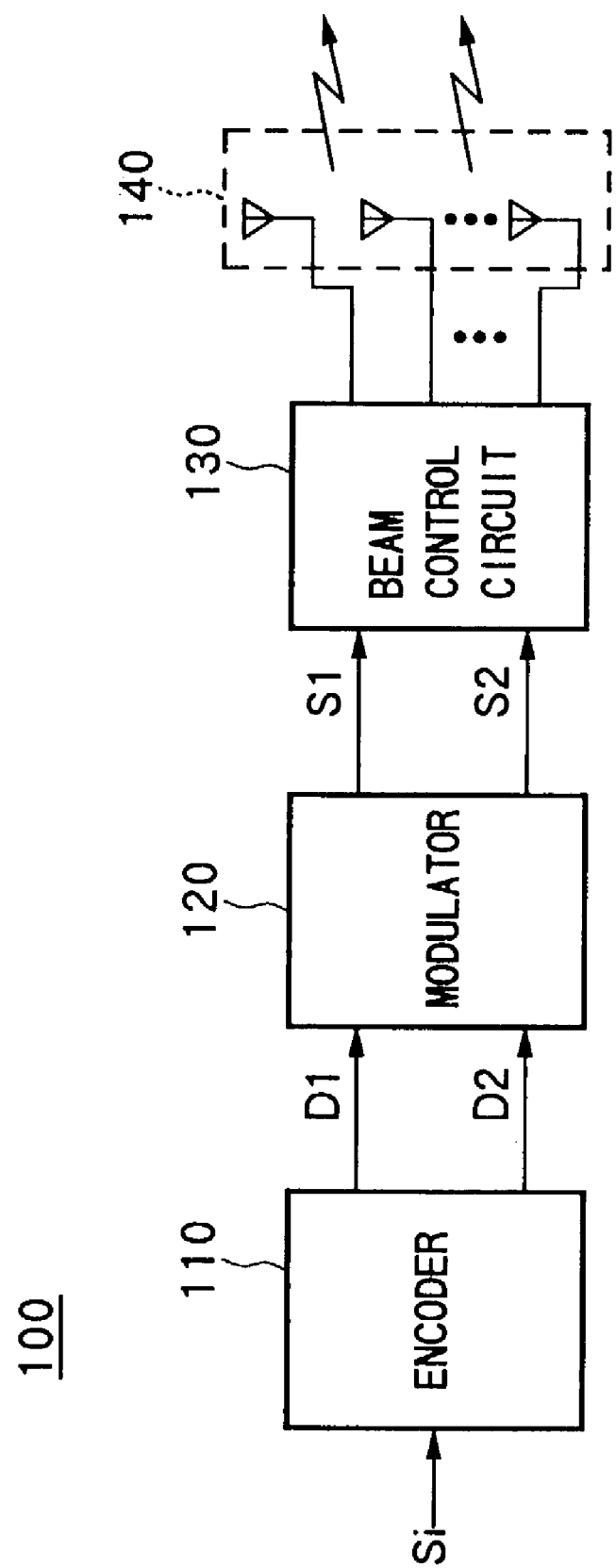
FIG. 2 is a view of an example of the configuration of a transmission apparatus in the communication system of the present invention.

FIG. 2 shows an example of the configuration of the transmission apparatus 100. As illustrated, the transmission apparatus 100 is comprised of an encoder 110, a modulator 120, a beam control circuit 130, and an antenna array 140. Below, the configuration and function of each part of the transmission apparatus 100 will be explained in detail with reference to FIG. 2.

The encoder 110 encodes an input signal $S_i$ by a predetermined encoding scheme and outputs at least two different strings of data (also referred to as "bit streams") D1 and D2. Note that, in the present embodiment, the encoding scheme in the encoder 110 and the number of the data strings output are not particularly limited. The optimum encoding scheme is selected in accordance with need. Further, the bit rates of the output data strings differ in accordance with the encoding scheme selected. For example, the encoder 110 generates a data string D1 with a coding rate of ½ by convolutional coding in accordance with the input signal $S_i$ and generates a data string D2 with a coding rate of ⅓ by another convolutional coding in accordance with the input signal $S_i$ in parallel with the generation of the data string D1. Therefore, the bit rates r1 and r2 of the two data strings D1 and D2 output by the encoder 110 are different, in this example, r1/r2=⅔.

The data strings D1 and D2 output by the encoder 110 are modulated to carrier frequencies by the modulator 120, respectively. Note that the modulator 120, for example, can spread the frequency spectrum of the transmission signal using a spread sequence such as in the CDMA communication scheme.

As a result of frequency modulation, two transmission signals S1 and S2 modulated to the carrier frequencies are generated and supplied to the beam control circuit 130.

The beam control circuit 130 controls the weights of the antenna elements so as to control the beam pattern of the antenna array 140 in accordance with the weights of the antenna elements. The beam control circuit 130 controls the beam pattern of the antenna array 140 by controlling the amplitudes and phases of transmission signals supplied to the antenna elements in accordance with their given weight functions.

The antenna array 140 is comprised of a plurality of antenna elements. Since the beam control circuit 130 supplies weighted transmission signals to the antenna elements, the beam pattern at the time of transmission is controlled in accordance with the weights of the antenna elements. The weights of the signals supplied to the antenna elements are controlled according to weight functions or weight vectors.

Figure 3:
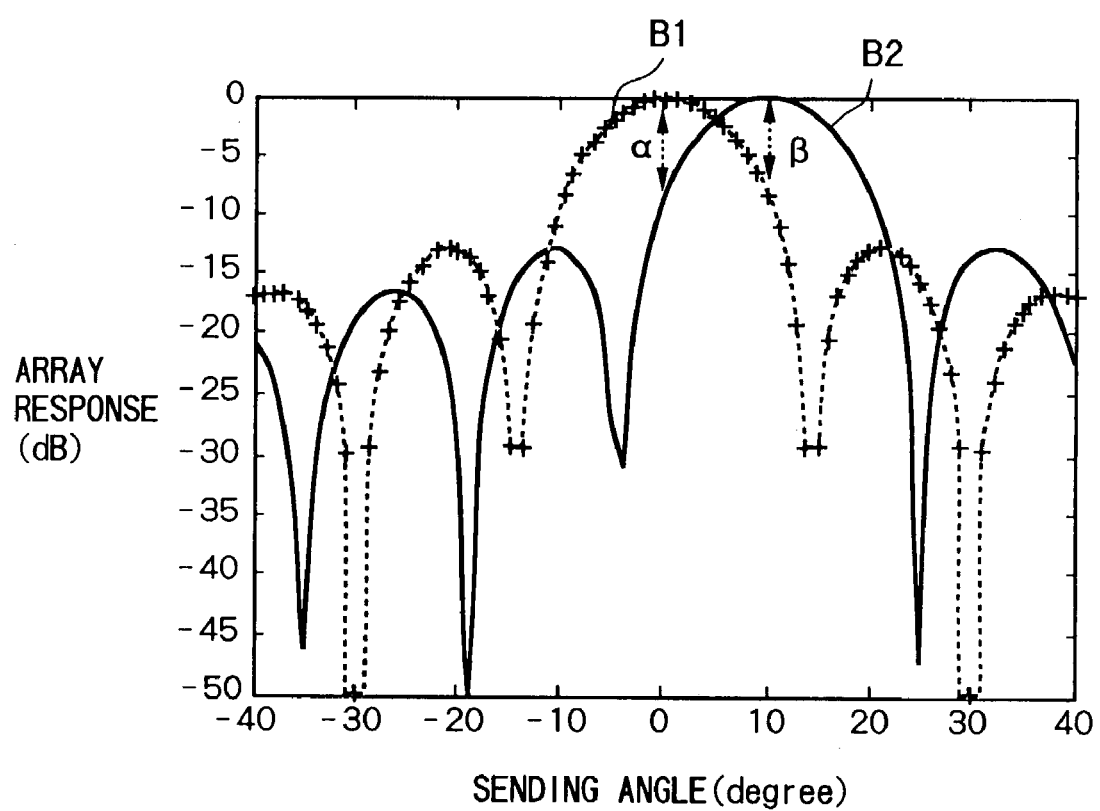
FIG. 3 is a graph of an example of an antenna beam pattern.

FIG. 3 is a graph showing an example of a transmission beam pattern of the antenna array. As illustrated, the antenna pattern is formed with two beams B1 and B2. Here, assuming that the peak directions of the main lobes of the beams B1 and B2 are θ1 and θ2, respectively, in the example of FIG. 3, θ1=0, and θ2=10 degrees.

To form the beam patterns B1 and B2 shown in FIG. 3, it is sufficient to supply the antenna elements with transmission signals controlled in amplitude and phase in accordance with the weight vectors W1 and W2. Here, if the number of the antenna elements constituting the antenna array 130 is n, the weight vectors W1 and W2 can be represented as vectors of the power n as shown in the following equations:

$$W1 = [1, e^{-j\pi\sin\theta_1}, e^{-j2\pi\sin\theta_1}, \ldots, e^{-j(n-1)\pi\sin\theta_1}] \quad (1)$$

$$W2 = [1, e^{-j\pi\sin\theta_2}, e^{-j2\pi\sin\theta_2}, \ldots, e^{-j(n-1)\pi\sin\theta_2}] \quad (2)$$

The beam control circuit 130 weights the transmission signals in accordance with the weight vectors and supplies the same to the antenna elements.

Figure 4:
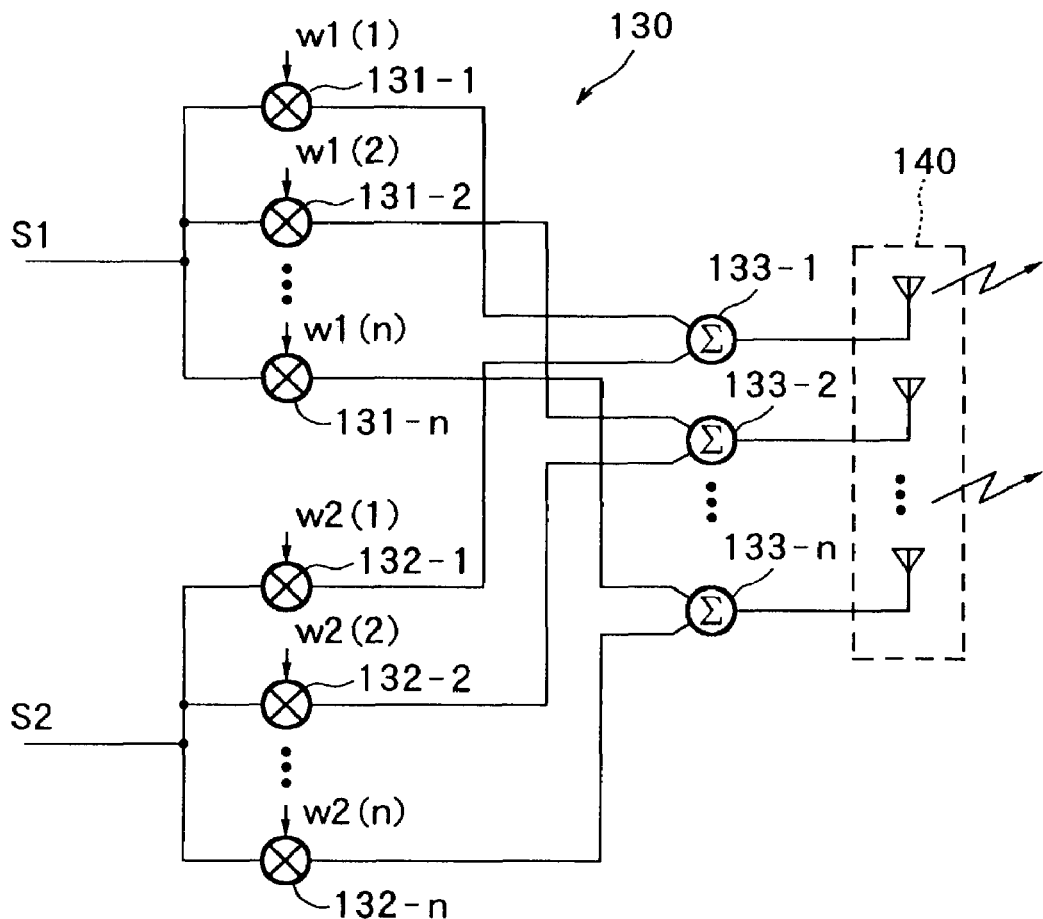
FIG. 4 is a circuit diagram of an example of a beam control circuit of a transmission apparatus.

FIG. 4 is a circuit diagram of an example of the configuration of the beam control circuit 130. In this example, the beam control circuit 130 controls the amplitudes and phases of the two transmission signals S1 and S2 output from the modulator 120 in accordance with the two weight vectors W1 and W2 and sends the signals to the antenna elements.

As shown in FIG. 4, the beam control circuit 130 is comprised of complex multipliers 131-1, 131-2, ..., 131-n, 132-1, 132-2, ..., 132-n and adders 133-1, 133-2, ..., 133-n.

Here, the weight vector W1 is represented as [w1(1), w1(2), ..., w1(n)] and the weight vector W2 is represented as [w2(1), w2(2), ..., w2(n)].

The modulated output signal S1 is multiplied by the n number of elements w1(1), w1(2), ..., w1(n) of the weight vector W1 by complex multipliers 131-1, 131-2, ..., 131-n, respectively. Similarly, the modulated signal S2 is multiplied by the n number of elements w2(1), w2(2), ..., w2(n) of the weight vector W2 by the complex multipliers 132-1, 132-2, ..., 132-n, respectively.

The outputs of the multipliers 131-1 and 132-1 are added by the adder 133-1 and supplied to the antenna element 141-1, the outputs of the multipliers 131-2 and 132-2 are added by the adder 133-2 and supplied to the antenna element 141-2, ..., and the outputs of the multipliers 131-n and 132-n are added by the adder 133-n and supplied to the antenna element 141-n.

The antenna elements 141-1, 141-2, ..., 141-n generate radio waves in accordance with the signals supplied by the adders 133-1, 133-2, ..., 133-n and radiate the same to space. As a result, the two transmission beams B1 and B2 are generated by the antenna array 140, and the two modulated signals S1 and S2 output by the modulator 120 are transmitted riding on different beams B1 and B2, respectively.

The beams B1 and B2, for example, have the patterns shown in FIG. 3. Namely, the beams B1 and B2 overlap each other partially in the space domain. Consequently, the transmission signals S1 and S2 sent by the beams B1 and B2 interfere with each other and have correlation. Here, the interferences between the beams B1 and B2 are made α and β, respectively. That is, the amount of the interference to the beam B1 by the beam B2 is assumed to be α, and the amount of the interference to the beam B2 by the beam B1 is assumed to be β.

Here, by assuming that steering vectors for forming the beams B1 and B2 are A1(=[a1(1), a1(2), ..., a1(n)], and A2(=[a2(1), a2(2), ..., a2(n)], the amounts of the interference α and β can be given by the following equations:

$$\alpha = \frac{W2 \times A1^T}{W1 \times A1^T} \quad (3)$$

$$\beta = \frac{W1 \times A2^T}{W2 \times A2^T} \quad (4)$$

In Equations (3) and (4), $A1^T$ and $A2^T$ are transposed matrixes of the steering vectors A1 and A2, respectively.

Figure 5:
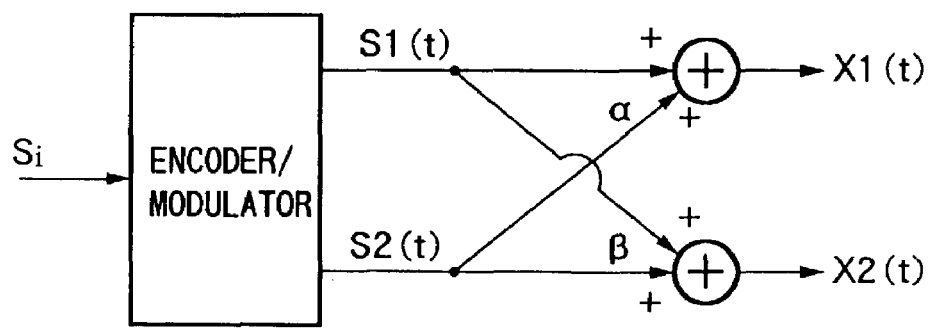
FIG. 5 is a view of the concept of a mathematic model of a transmission apparatus.

The mathematic model of the transmission apparatus of the present embodiment in accordance with the amounts of the interference α and β between the beams B1 and B2 can be shown in FIG. 5. As illustrated, the transmitted signal $S_i$ is encoded by the encoder 110 and modulated, then two modulated output signals S1 and S2 are output. Since these modulated output signals are transmitted riding on the beams B1 and B2 of the antenna array 140, respectively, the signal transmitted riding on the beam B2 is mixed with the signal transmitted by the beam B2. Similarly, the signal transmitted by the beam B1 is mixed with the signal transmitted by the beam B1.

Here, the two modulated output signals output by the modulator 120 are made S1(t) and S2(t), and the modulated output signals S1(t) and S2(t) are input to the beam control circuit 130, respectively. The beam control circuit 130 supplies the transmission signals weighted by the weight vectors to the antenna elements and emits them to space by the transmission beams B1 and B2 formed by the antenna elements. As a result of the interference between the beams B1 and B2, the emitted signals X1(t) and X2(t) in the directions of the main lobes of the beams B1 and B2 can be represented as in the following equations.

$$X1(t) = S1(t) + \alpha S2(t) \quad (5)$$

$$X2(t) = S2(t) + \beta S1(t) \quad (6)$$

In this way, the two signals S1(t) and S2(t) transmitted by the beams B1 and B2 are emitted into space while interfering with each other. Thus, the receiving side, for example, separates and receives the transmitted signals by a reception antenna formed with two or more receiving beams. As a result, there is correlation between the at least two received signals. In accordance with the correlation of the received signals, the error rates of the decoded signals can be reduced and the reliability of the communication system improved by maximum likelihood estimation, for example, Viterbi decoding.

Figure 6:
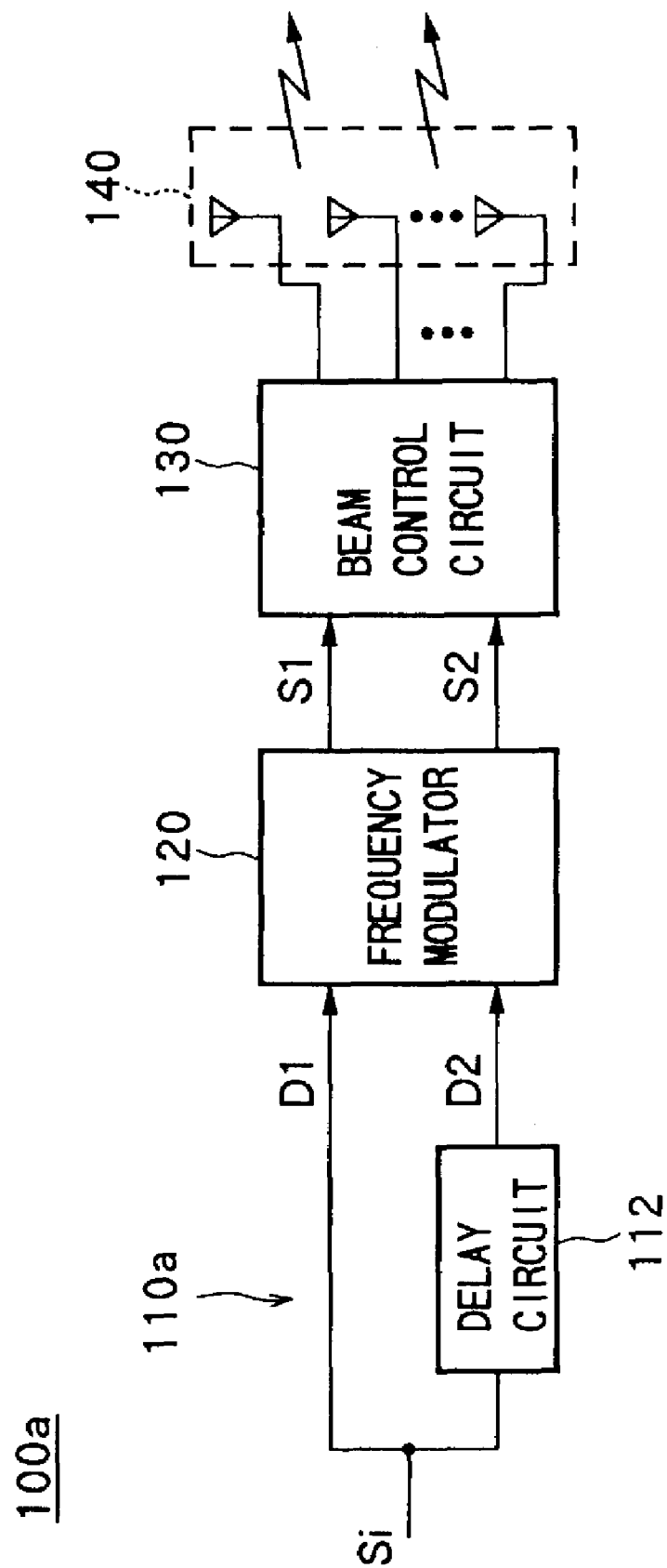
FIG. 6 is a view of another example of a transmission apparatus of the present invention, wherein the encoder is comprised of a delay circuit.

FIG. 6 shows another example of the configuration of the transmission apparatus of the present embodiment. As illustrated, in the transmission apparatus 100a, except for the difference of the encoder 110a from the encoder 110 of the transmission apparatus shown in FIG. 2, the rest of the configuration is substantially the same as the transmission apparatus 100 shown in FIG. 2.

The transmission apparatus 100a is comprised of a delay circuit 112. The input signal $S_i$ is, for example, a data string generated based on predetermined information source data. The input signal $S_i$ is, on the one hand, input to the modulator 120 as a data string D1, and on the other hand, input to the delay circuit 112. The delay circuit 112 delays the bits of the input data string by a predetermined delay time, generates a data string D2 that is delayed in time compared to the input signal Si, then inputs it to the modulator 120.

As described above, in the transmission apparatus 100a, the encoder 110a supplies the delayed signal of the input signal $S_i$ along with the original signal to the modulator 120 as an encoded data string.

The partial circuits following the encoder 110a have substantially the same configuration and function in the same way as the portions of the transmission apparatus 100 shown in FIG. 2. Namely, the modulator 120 generates the modulated signals S1 and S2 modulated to predetermined carrier frequencies in accordance with the two input data strings D1 and D2 and outputs them to the beam control circuit 130. The beam control circuit 130 generates the signals supplied to the antenna elements of the antenna array 140 in accordance with predetermined weight vectors. In the antenna array 140, the radio waves corresponding to the signals supplied by the antenna elements are emitted to space, so the radio wave signals are emitted by the beam patterns set by the weight vectors, and the radio wave signals are transmitted by two transmission beams partially overlapping each other in space.

That is, by utilizing the encoder 100a of this example, using the delay circuit 112 for delaying the input signal by a predetermined delay time, the original information data strings are sent twice shifted in time by exactly the delay time of the delay circuit 112. For example, by transmitting the original signal and the delayed signal thereof riding on different beams, when the reception apparatus separates and receives the signals transmitted by the two beams, the two received signals have correlation with each other. In the reception apparatus, by decoding the received signals by maximum likelihood estimation, for example, Viterbi decoding, the error rates of the signals reproduced by the decoding are greatly reduced, so the reliability of the communication system can be improved.

Figure 7:
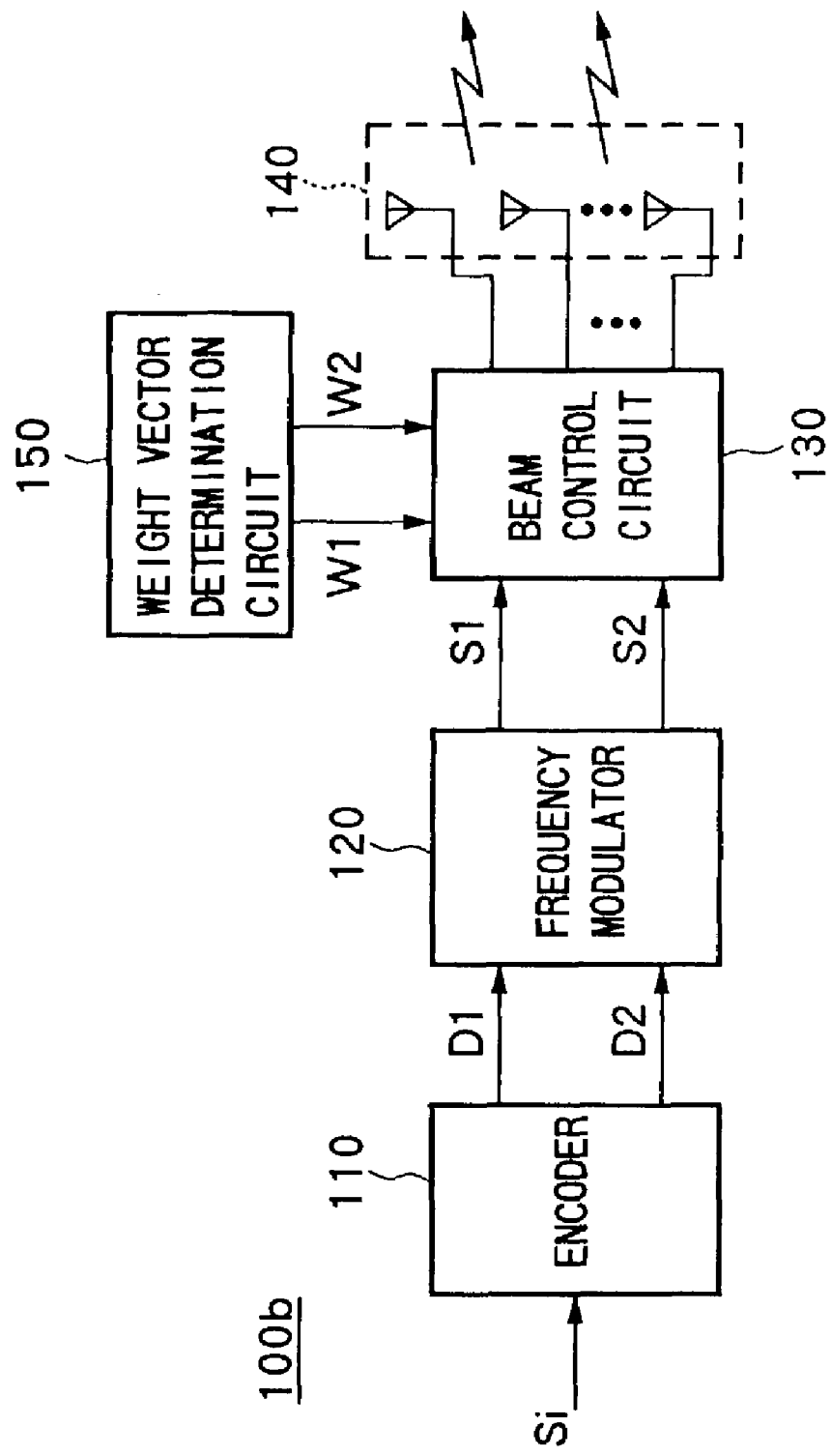
FIG. 7 is a view of an example of the configuration of a transmission apparatus including a weight vector determination circuit for finding a weight function.

FIG. 7 shows another example of the configuration of the transmission apparatus. As illustrated, in this example, a weight vector determination circuit 150 for providing the weight vectors W1 and W2 to the beam control circuit 130 is provided in the transmission apparatus 100b.

As described above, in the beam control circuit 130, by supplying signals changed in amplitudes and phases of the modulated output signals S1 and S2 in accordance with the given weight vectors to the antenna elements of the antenna array 140, the predetermined beams are formed. For example, two beams partially overlapping in space are formed in accordance with the two weight vectors W1 and W2. By transmitting the modulated output signals riding on these beams, signals with certain correlations are transmitted. Then, the receiving side receives the signals transmitted by the two beams and estimates the original transmission signal by maximum likelihood estimation, for example, by Viterbi decoding, based on the correlation between the received signals.

In practice, the situation of the channel between the transmitting and the reception apparatus changes all the time. In particular, in a mobile communication system, when the reception apparatus is, for example, a mobile communication terminal, since the channel between the transmitting apparatus and the reception apparatus changes at all times, at the transmitting side, if the beams of the transmission antenna are controlled in accordance with constant weight vectors, it is impossible to deal with changes of the channel and the quality of communication may deteriorate. Therefore, it is desirable to adapt the beams of the transmission antenna according to the situation of the channel. One of the effective methods for realizing this, as in this example, is to provide a weight vector determination circuit, set optimal weight vectors in accordance with the change of the channel, and provide the same to the beam control circuit.

In FIG. 7, the weight vector determination circuit 150 determines the optimum weight vectors W1 and W2 in accordance with the characteristics of the channel and provides the same to the beam control circuit 130. The estimation of the characteristics of the channel can be realized by transmitting a known signal between the transmitting and the reception apparatuses. For example, before the start of the communication, the transmission apparatus 100 transmits a predetermined pilot signal. Note that, the pilot signal is a signal determined by a predetermined rule and must be known by both the transmitting and the reception apparatuses. The reception apparatus can estimate the distortion characteristics of the channel in accordance with the received pilot signal. Then the characteristics of the channel estimated by the reception apparatus are transmitted to the transmitting side. The weight vector determination circuit 150 can learn the distortion characteristics of the channel in accordance with the estimated result received from the reception apparatus and set the optimum weight vectors accordingly. Further, for the simplification of the reception apparatus, the reception apparatus does not estimate the channel characteristics but simply return the received pilot signal to the transmission apparatus. In this case, the transmission apparatus can estimate the distortion characteristics of the channel based on the pilot signal returned by the reception apparatus. The weight vector determination circuit 150 can set the optimal weight vectors in accordance with the estimation result.

After the start of the communication, the transmission apparatus inserts the pilot signal into the transmission signals and sends the same at a predetermined interval. Based on this, the channel characteristics can be estimated by the transmission apparatus or the reception apparatus at a certain time interval, so that in the case of mobile communication, the optimal weight vectors can be dynamically set in accordance with the change of the channel characteristics.

Note that the method of the determination of the weight vectors is not limited to the examples described above. For example, when the changed pattern of the channel characteristics is known by experience, a plurality of weight vectors are calculated in accordance with the possible values of the channel characteristics and stored in a memory device. During communication, the optimal weight vectors according to experience are read from the memory device. By controlling the beams accordingly, although the optimal weight vectors cannot be set in real time as described above, the weight vectors can be suitably set within a certain range of error.

Below, the reception apparatus 300 in the communication system of the present invention will be explained.

Figure 8:
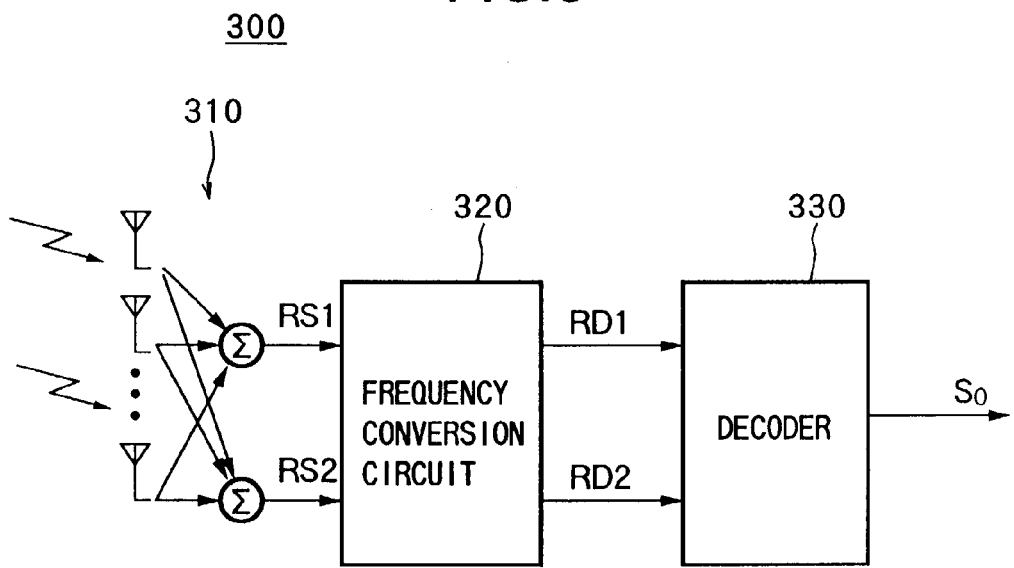
FIG. 8 is a view of an example of the configuration of a reception apparatus.

FIG. 8 is a view of an example of the configuration of the reception apparatus 300. As illustrated, the reception apparatus 300 is comprised of a reception antenna 310, a frequency conversion circuit 320, and a decoding circuit 330.

The reception antenna 310 receives the radio wave signals sent by the transmission apparatus 100 and supplies the received signals to the frequency conversion circuit 320.

Here, the reception antenna 310 can be comprised by a single antenna or an antenna array formed by a plurality of antenna elements. The reception antenna is optimally controlled in its characteristics, for example, its beam pattern, to be able to compensate for the distortion of the channel. Namely, the reception antenna can be considered as a spatial filter. The spatial filter is controlled to have characteristics reverse to those of the channel. Accordingly, the distortion generated in the channel is suppressed by the reception antenna, and the equalization processing of the received signals is executed in the space domain. A preferable example of the reception antenna 310 is an adaptive array antenna.

The signals received by the reception antenna 310 are supplied to the frequency conversion circuit 320 wherein the frequency is converted. As a result of the frequency conversion, a received signal converted from the carrier frequency to, for example, the baseband is output. Here, for example, the transmission apparatus transmits two transmission signals S1 and S2 riding on different beams, while the reception antenna 310 spatially separates the received signals and receives the two signals RS1 and RS2 in accordance with the two beams of the transmitting side, respectively. The received signals RS1 and RS2 are frequency converted by the frequency conversion circuit 320, whereby two reception data strings RD1 and RD2 are output.

The signals transmitted by the transmission apparatus 100 have correlation with each other in accordance with the overlap of the beams of the transmission antenna array 140. Namely, in the reception apparatus 300, the two signals RS1 and RS2 received by the reception antenna 310 have correlation with each other. Therefore, there is also correlation between the two data strings RD1 and RD2 output from the frequency conversion circuit 320.

The decoding circuit 330 estimates a decoded signal $S_0$ nearest to the original transmitting information sent by the transmission apparatus 100, that is, the transmission signal $S_i$ shown in FIG. 2, in accordance with the data strings RD1 and RD2 obtained by the frequency conversion based on maximum likelihood estimation, for example, Viterbi decoding.

The decoding circuit constituted based on the Viterbi decoding algorithm calculates the metric showing the distance between the codes as likelihood functions of the path through the states of the received data string based on the states, traces the change over time, and selects from among the candidates of the different times the one having the maximum likelihood from the received signal, and finally estimates the data string with the maximum likelihood as the original information string transmitted by the transmitting side. In this case, the data string obtained is the output at the time when the path is determined in the decoding process. The corresponding information data can be obtained by finding the input string for this output in reverse. In this way, by utilizing the Viterbi decoding algorithm, the data string with the maximum likelihood can be found effectively by using a trellis diagram.

Figure 9:
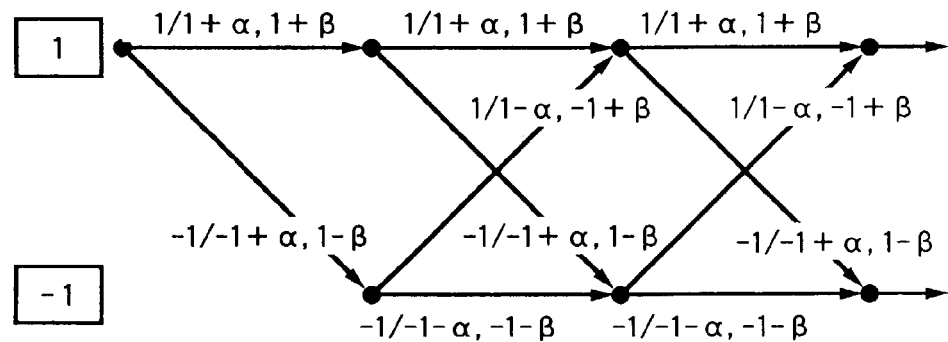
FIG. 9 is a view of a trellis chart of Viterbi decoding in a decoding circuit of the reception apparatus.

FIG. 9 is a trellis diagram used for decoding processing of the decoding circuit 330 in the reception apparatus 300 shown in FIG. 8. The decoding circuit 330 can find the estimated signal $S_0$ of the original transmission signal in accordance with the received data string using the trellis diagram shown in FIG. 9 based on the Viterbi decoding algorithm.

Figure 10:
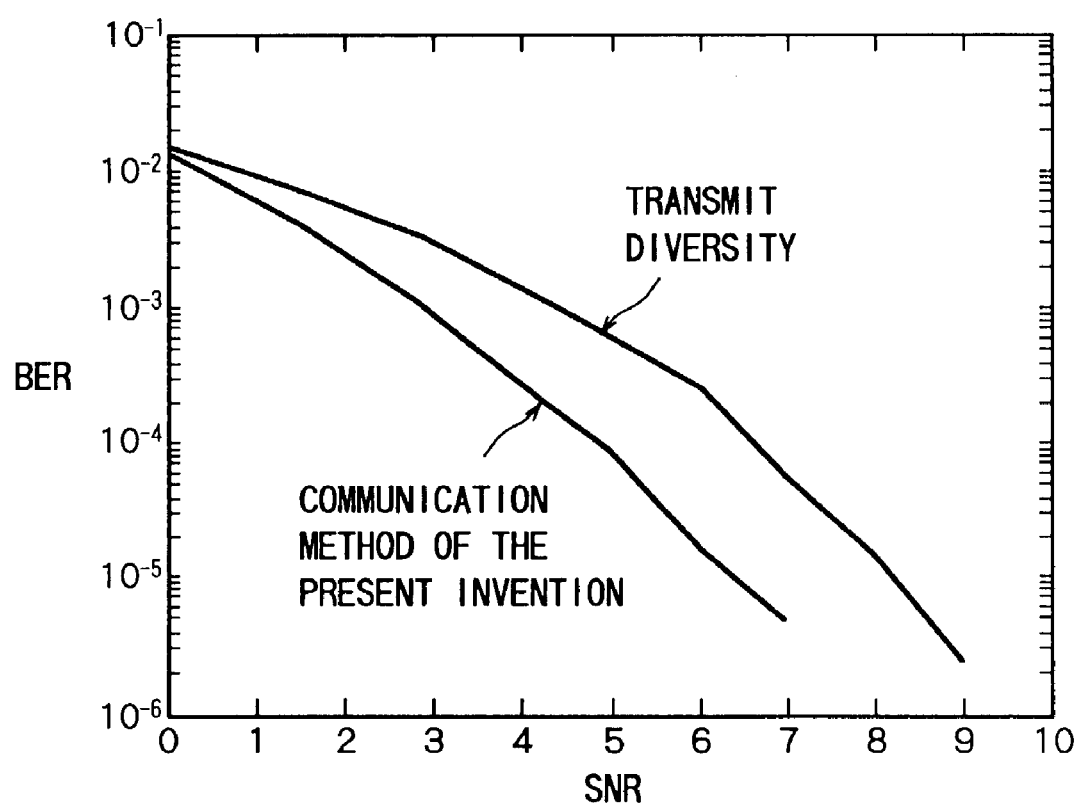
FIG. 10 is a graph for comparison of the bit error rate of the communication scheme of the present invention with that of the diversity transmission scheme of the prior art.

FIG. 10 is a graph of the result of the bit error rate (BER) of the communication system of the present embodiment calculated by computer simulation. Here, for comparison, the bit error rate of conventional diversity transmission is also plotted.

Here, as a condition for computer simulation, the channel is supposed to be in a Rayleigh fading environment. The amounts of the interference α and β between the two transmission beams B1 and B2 formed by the transmission antenna array of the transmission apparatus are equal and $\alpha=\beta=0.7994$. Note that, the amounts of the interference between the transmission beams B1 and B2 are known information in the reception apparatus.

The transmission antenna array is an antenna array constituted by six antenna elements, while the reception antenna is an antenna array constituted by six antenna elements. The transmission antenna array forms two transmission beams B1 and B2 and makes the angles of the main lobes of the transmission beams B1 and B2 0 and 5 degrees, respectively. The receiving side spatially separates and receives the received signals by the reception antenna array. Two receiving beams are formed by the reception antenna array. The angles of the main lobes of the receiving beams are made 0 and 10 degrees, respectively.

As shown in FIG. 10, along with the increase of the signal to noise ratio SNR (for example, the ratio of the received signal power and the average power of noise), the bit error rate of the received signal decreases. Under the same transmitting and receiving conditions and the same channel environment, the bit error rate of the transmitting and receiving method according to the present invention can be further suppressed in comparison with the diversity transmission scheme of the prior art. Namely, according to the communication method of the present invention, the error of the received signal becomes smaller and an improvement of the reliability of the communication system can be realized.

In the above embodiment of the present invention, the transmission apparatus 100 and the reception apparatus 300 use the array antennas to form a plurality of beams and transmit and receive the signals. The present invention is not limited to this. In addition to array antennas, it is possible to use other antennas capable of controlling the beam patterns. Namely, the transmission apparatus 100 can form a plurality of transmission beams partially overlapping each other and transmit the signals riding on the transmission beams so as to transmit the encoded signals in both the space and time domain. The reception apparatus 300 can separate and receive at least two signals having correlation with each other by a plurality of receiving beams and estimate the original transmission signal by maximum likelihood estimation.

Note that the separating and reception at the receiving side are not limited in space domain by the reception antenna beams and can also be performed in the time or frequency domain. For example, the receiving side can separate and receive in time the two transmission signals transmitted shifted in time by the transmission apparatus 100a shown in FIG. 6 so as to receive two signals having correlation with each other. Further, when the transmitting side transmits the two signals modulated to different carrier frequencies by different transmission beams, the receiving side can separate and receive the two transmission signals according to the difference of the frequencies of the signals.

As described above, according to the transmission apparatus and the communication system of the present invention, the transmitting side transmits the transmission signals encoded by different encoding processing riding on a plurality of transmission beams by using a transmission antenna forming a plurality of beams partially overlapping each other and the receiving side separates and receives signals and decodes the original transmission signal by maximum likelihood estimation considering the correlation between the received signals so as reduce the error rates of the decoded signals and realize an improvement of the efficiency of the communication system and improvement of the quality of communication.

Furthermore, by Viterbi decoding processing as the maximum likelihood estimation in the reception apparatus, there are the advantages that real time decoding can be realized and simplification of the reception apparatus and the higher speed of the decoding process can be realized.

The invention claimed is:

1. A transmission apparatus comprising:
   an encoding means for encoding a transmission signal to generate at least a first transmission signal and a second transmission signal, the encoding means including a delay circuit for delaying the second transmission signal by a predetermined delay time compared to the first transmission signal,
   a transmission antenna forming at least a first beam and a second beam, and
   a transmitting means for transmitting said first transmission signal riding on said first beam and transmitting said second transmission signal riding on said second beam,
   wherein said first beam and second beam are formed so as to partially overlap each other.

2. A transmission apparatus as set forth in claim 1, wherein
   the transmission antenna is an array antenna comprising a plurality of antenna elements.

3. A transmission apparatus as set forth in claim 2, wherein
   the transmitting means weights the first transmission signal and the second transmission signal modulated to predetermined carrier frequencies with predetermined weights and supplies them to the antenna elements.

4. A transmission apparatus as set forth in claim 3, further comprising
   a weight determining means for determining weights of the antenna elements and controlling the beam patterns of the first beam and the second beam.

5. A transmission apparatus as set forth in claim 4, wherein
   the weight determining means determines the weights of the antenna elements in accordance with channel characteristics.

6. A transmission method comprising:
   a step of encoding a transmission signal to generate at least a first transmission signal and a second transmission signal, the step including delaying the second transmission signal by a predetermined delay time compared to the first transmission signal,
   a step of modulating the first transmission signal and the second transmission signal to predetermined carrier frequencies,
   a step of weighting the first transmission signal by a first weight, supplying the same to antenna elements constituting a transmission antenna, transmitting the same by forming a first transmission beam and of weighting the second transmission signal by a second weight, supplying the same to antenna elements, and transmitting the same by forming a second transmission beam partially overlapping the first transmission beam.

7. A transmission method as set forth in claim 6, further comprising determining the first weight and the second weight in accordance with channel characteristics.

8. A communication system comprising:
   an encoding means for encoding a transmission signal to generate at least a first transmission signal and a second transmission signal, the encoding means including a delay circuit for delaying the second transmission signal by a predetermined delay time compared to the first transmission signal,
   a transmission antenna forming at least a first transmission beam and a second transmission beam,
   a transmitting means for transmitting said first transmission signal riding on said first transmission beam and transmitting said second transmission signal riding on said second beam,
   a reception antenna forming a predetermined receiving beam and receiving signals transmitted by said transmission antenna using the receiving beam, and
   a decoding means for estimating the transmission signal by a maximum likelihood estimation according to the received signals of the reception antenna,
   wherein said first transmission beam and second transmission beam are formed so as to partially overlap each other.

9. A communication system as set forth in claim 8, wherein
   the transmission antenna is an array antenna comprising a plurality of antenna elements.

10. A communication system as set forth in claim 9, wherein
    the transmitting means weights the first transmission signal and the second transmission signal modulated to predetermined carrier frequencies with predetermined weights and supplies the same to the antenna elements.

11. A communication system as set forth in claim 10, further comprising
    a weight determining means for determining weights of the antenna elements and controlling the beam patterns of the first beam and the second beam.

12. A communication system as set forth in claim 11, wherein
    the weight determining means determines the weights of the antenna elements in accordance with channel characteristics.

13. A communication system as set forth in claim 8, wherein
    the reception antenna is an array antenna comprising a plurality of antenna elements.

14. A communication system as set forth in claim 8, wherein
    the reception antenna shapes the beam pattern of the receiving beam in accordance with the transmission distortion of a channel.

15. A communication system as set forth in claim 8, further comprising
    a separating receiving means for separating the received signal by the reception antenna.

16. A communication system as set forth in claim 15, wherein
    the decoding means estimates the original transmission signal based on a correlation between at least two received signals output from the separating receiving means.

17. A communication system as set forth in claim 8, wherein
    the reception antenna forms a first receiving beam and a second receiving beam and separates and receives the signals transmitted by the transmission antenna by the first receiving beam and the second receiving beam.

18. A communication system as set forth in claim 17, wherein
    the decoding means estimates the original transmission signal based on a correlation between the received signal received by the first receiving beam and the received signal received by the second receiving beam.

19. A communication system as set forth in claim 17, wherein the decoding means estimates the original transmission signal based on a correlation between the received signal received by the first receiving beam and the received signal received by the second receiving beam using a Viterbi decoding algorithm.

20. A communication method comprising:

a step of encoding a transmission signal to generate at least a first transmission signal and a second transmission signal, the step including delaying the second transmission signal by a predetermined delay time compared to the first transmission signal, a step of modulating the first transmission signal and the second transmission signal to predetermined carrier frequencies, a step of weighting the first transmission signal by a first weight, supplying the same to antenna elements constituting a transmission antenna, and transmitting the same by forming a first transmission beam and of weighting the second transmission signal by a second weight, supplying the same to antenna elements, and transmitting the same by forming a second transmission beam so as to partially overlap the first transmission beam, a step of shaping a beam for compensation of the transmission distortion of a channel and receiving the signals sent by the transmission antenna by the shaped beam, and a step of estimating the original transmission signal in accordance with the received signals by the reception antenna by maximum likelihood estimation.

21. A communication method as set forth in claim 20, further comprising determining the first weight and the second weight in accordance with channel characteristics.

22. A communication method as set forth in claim 20, further comprising a step of forming a first receiving beam and a second receiving beam and separating and receiving the signals transmitted by the transmission antenna by the first receiving beam and the second receiving beam.

23. A communication method as set forth in claim 22, further comprising a step of estimating the original transmission signal by maximum likelihood estimation based on a correlation between the received signal received by the first receiving beam and the received signal received by the second receiving beam.

24. A communication method as set forth in claim 22, further comprising a step of estimating the original transmission signal based on a correlation between the received signal received by the first receiving beam and the received signal received by the second receiving beam using a Viterbi decoding algorithm.

* * * * *